United States Patent Office 3,520,701
Patented July 14, 1970

3,520,701
METHOD OF MAKING A FOAMED MEAT FLAKE
Robert B. Rendek, 411 Clayton Road, Hillside, Ill. 60162; Joseph C. Wilcox, 3 West Rocket Circle, Park Forest, Ill. 60460; and Everett W. Stone, Jr., 9424 Jackson Ave., Brookfield, Ill. 60513
No Drawing. Filed Feb. 14, 1966, Ser. No. 527,076
Int. Cl. A23b *1/04*
U.S. Cl. 99—208                1 Claim

ABSTRACT OF THE DISCLOSURE

A novel foamed edible flake meat product of dried emulsified comminuted meat, water, salt and flavoring, and method for making same using microwave drying.

This invention relates to a novel meat product and to a method for producing same. More particularly, this invention relates to a foamed meat product which has a unique consistency and flavor due to microwave treatment during manufacture.

The meat industry is continuously exploring ways to extend the sale of meat. In so doing various approaches have been taken.

Meat has been sold in fresh, frozen, freeze-dried, canned, smoked, pickled, salted, or other forms. The overriding desire is to offer for sale, meat which is edible, has good flavor, even after extended periods of storage, and is better than any form sold before it.

One object of the invention is to provide a novel foamed meat product.

Another object is to provide a novel process for the manufacture of said novel foamed meat product.

Still another object is to provide a foamed meat product having a unique dry consistency.

A further object is to provide a meat product of the above character having a desirable flake form.

A still further object is to provide a novel snack-type food.

Another object is to provide a snack-type food which has high protein content.

Another object is to provide a meat product which requires no refrigeration after processing and which will remain edible for an extended period of time.

Another object is to provide a meat product capable of being flavored in a variety of ways to extend its range of sale.

Another object is to provide meat products of unique flavor.

Another object is to provide a high protein food item useful for making various edible items.

Other objects of the invention will in part be obvious and will in part appear hereinafter.

It has now been found that a novel edible food product of unique physical form and even taste may be made by emulsifying meat in untrimmed or trimmed condition, or its equivalent in protein content, and water and a desired quantity of salt and flavoring to form a wet mass, said wet mass being then either stuffed and processed or formed and chilled, and then treating said mass, preferably in bite size portions, such as thin slices, with microwave energy to dryness whereby unique foaming of the mass throughout its thickness is accomplished. More particularly, it has been found that a desirable foamed high-protein edible food product of unique physical form and taste and having an extended shelf-life without refrigeration may be made by comminuting untrimmed or trimmed meat items such as chuck, blade, jowls, liver, and the like, or proteinaceous material, such as dried meat, with or without extenders incorporated therein, and then admixing same with water and a desired quantity of salt and flavoring to form a heavy emulsion, which is then preferably either formed and processed or formed and chilled prior to unitizing such as by thinly slicing it in cased or uncased condition, or balling or chipping and then subjecting the unitized portions thereof to microwave energy, and preferably hot air, to cause drying. A unique foamed meat flake, chip, ball or particle is thereby produced.

One typical manufacturing procedure is as follows:

(1) The basic meat ingredients (meat items, protein, fat) are ground and mixed into a homogeneous mass. Extenders such as milk solids, flour, etc. may be used to prevent grease-out and also to lower ingredient cost. Water, in the form of ice, and salt and flavoring are added prior to grinding or during emulsification to insure thorough mixing.

(2) The ground and/or emulsified ingredients are then either:

(a) stuffed into a casing, or
(b) extruded without a casing, and then either
(c) heat processed, or
(d) simply chilled.

(3) The heat processed or chilled wet mass is then sliced and the slices allowed to drop onto a conveyor of a microwave oven. The slices pass through the oven where they are dried into a foamed flake. The amount of microwave energy applied is determined by product loading on the conveyor and by conveyor speed. Air, and preferably heated air, is circulated through the microwave oven. Reduction in moisture content to levels of 2–6% are desired for crispness and stability.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed examples:

EXAMPLE I

One hundred pounds (lbs.) skinless, shankless, boneless ham with no fat removed is ground through a 1/8 inch plate. The ground product is then placed in a Cut-Mix Chopper, such as the Kramer-Grebe Model 90, along with 20 lbs. ice, 2 lbs. 8 ounces (oz.) salt, 0.25 oz. sodium nitrite, 7/8 oz. sodium isoascorbate, 8 oz. CharSol (No. 6) and 10 oz. of Ham Flavor GL–72. The mixture is chopped using accepted techniques. It is then stuffed into No. 2 x 30 fibrous casings and processed in a smokehouse to an internal temperature of 145–147° F. Subsequently the mass is subjected to a steam-cook treatment, then a tap water shower and cooled in a cooler.

The encased mass is then sliced (typically about 3/32 inch thick), arranged on trays and the trays passed through the microwave oven to effect drying of the slices. Moisture content will approximate 0.52%, the fat content will be about 61.5%, and the protein content will be about 33%.

EXAMPLES II TO XI

One hundred pounds skinless, shankless, boneless ham, trimmed of excess surface and seam fat is ground through a 1/8 inch plate. The ground product is then chopped in a standard meat chopper, such as a Buffalo Chopper, Model 44X using accepted techniques. Aliquot portions are removed, placed in another chopper of standard design, such as a Hobart Chopper Model T215GA and the other ingredients blended in accord with the following chart:

TABLE I

| Ingredients | Batch No. (mixtures per pound) | | | | | | | | | |
|---|---|---|---|---|---|---|---|---|---|---|
| | 21 | 22 | 25 | 27 | 28 | 29 | 30 | 31 | 33 | 36 |
| Ham | 100.00 | 100.00 | 100.00 | 100.00 | 100.00 | 100.00 | 100.00 | 100.00 | 100.00 | 100.00 |
| Ice | 20.00 | 20.00 | 20.00 | 200.0 | 20.00 | 20.00 | 20.00 | 20.00 | 20.00 | 20.00 |
| Spice: | | | | | | | | | | |
| Salt | 2.5 | 2.5 | 2.5 | 2.5 | 2.5 | 2.5 | 2.5 | 2.5 | 2.5 | 2.5 |
| Sodium nitrite | .15 | .15 | .15 | .15 | .15 | .15 | .15 | .15 | .15 | .15 |
| Sodium isoascorbate | .06 | .06 | .06 | .06 | .06 | .06 | .06 | .06 | .06 | .06 |
| CharSol (No. 6) (9 lbs./gal.) | .5 | .5 | .5 | .5 | .5 | .5 | .5 | .5 | .5 | .5 |
| Ham flavor GL-72 | .62 | .62 | .62 | .62 | .62 | .62 | .62 | .62 | .62 | .62 |
| Sausagetone | | | | .12 | .37 | | | | | |
| Barbecue sauce | | | | | | 2.00 | | | | |
| 5% solution smoke flavor | | | | | | | .25 | | | |
| 5% solution bacon flavor | | | | | | | | .25 | | |
| V-9642 bacon flavor | | | | | | | | | 2.75 | |
| Ground cloves | | | | | | | | | .06 | |
| Ground cinnamon | | | | | | | | | | .5 |

The resultant mixture is then stuffed into No. 40 cellulose NoJax casings, processed in a smokehouse to an internal temperature of 145–147° F., steam-cooked and tap water showered and cooled in a meat cooler.

The encased mixture is then sliced and the slices passed through a microwave oven on a conveyor belt to cause drying. Moisture and fat analyses are as follows:

TABLE II

| Lot | Moisture, percent | Fat, percent |
|---|---|---|
| 21 | 3.55 | 21.5 |
| 22 | 1.84 | 20.7 |
| 25 | 3.04 | 21.2 |
| 27 | 3.40 | 21.3 |
| 28 | 3.75 | 22.0 |
| 29 | 2.72 | 22.4 |
| 30 | 3.10 | 21.9 |
| 31 | 2.63 | 25.6 |
| 33 | 3.34 | 23.6 |
| 36 | 3.56 | 22.6 |

In carrying out the invention, any ground meat, wet (fresh), or dry may be used, such as:

Boneless beef
Beef trimmings
Boneless beef plates
Boneless beef flanks
Beef fat
Beef cheeks
Beef gullets
Beef hearts—cap off
Beef tongues
Beef tripe cooked
Ham trimmings
Corned pork shoulder meat
Pork shoulder trimmings
Lean picnic trimmings
Skinned pork belly meat
Regular pork trimmings
Pork neck bone trimmings
Pork blade meat
Picnic shank meat
Ham shank meat
Pork trimmings
Pork skinned jowls
Pork belly fat skin off
Ham fat skin off
Pork back fat skin off
Pork cheeks
Pork ham skins
Pork hearts
Pork jowls
Pork livers
Bacon ends and pieces
Pork snouts
Pork stomachs
Pork tongues
Pork tongue trimmings
Pork fat
Smoked Pork skins
Regular boneless veal
Veal cheeks
Veal gullets
Veal hearts
Veal tripe
Regular boneless mutton
Mutton cheeks
Mutton gullets
Mutton hearts
Mutton tripe If fresh meat is used, it should preferably contain about 10 to 25% protein, about 5 to 50% fat, and about 30 to 80% water. Fresh meat having a 20% protein, 10% fat and 70% water content is one of the best for such use.

If dried meat is used, it should preferably contain about 50 to 80% protein, about 10 to 60% fat, about 1.0 to 12% water and about 3 to 10% ash. Dried meat having a 67% protein, 25% fat, 3% water and 5% ash content is the one usually used.

The amount of water, preferably in the form of ice, added to the fresh or dried ground meat should be sufficient to suitably emulsify it into a heavy emulsion or wet mass. About 15 to 35 parts by weight of the ground meat and usually 20% is needed. The amount actually used should be governed by reference to the additional cost of dehydration incurred with each increment of water.

Salt, spice and flavoring of various types is used. Usually about 2 to 20% and preferably 4 to 12% by weight of the ground meat is required to palatally season the product. Among the spice and flavorings that may be used, the following are typical:

Salt
Garlic powder
Sodium nitrite
Ground black pepper
Spice extractives
Sugar
Dextrose
Sodium isoascorbate
CharSol
Ham spice
Ham flavor
Ham seasoning
Wheat flour
Baking powder
Corn starch
Maple sugar
Hamette spice
Ham coating spice
Ham pumping pickle
Sausagetone
Barbecue sauce
Imitation hickory smoke
Imitation smoked bacon
Imitation bacon flavor
Ground cloves
Ground cinnamon
Crushed pineapple
Citric acid
Imitation pineapple flavor
Imitation ham flavor
Imitation apple juice
Imitation banana flavor
Imitation butterscotch flavor
Imitation grape flavor
Imitation lemon flavor
Imitation raspberry flavor
Imitation strawberry flavor
Imitation cherry flavor
Imitation lemon-lime flavor
Imitation orange juice flavor
Imitation honey flavor
Imitation almond flavor
Imitation cocoa enhancer flavor
Imitation burnt sugar flavor It should be noted that the above recitation of flavoring includes sugar and/or dextrose and imitation fruit flavor. This invention contemplated unique flavor chips with high protein content but uniquely with fruit flavor and sweetened whereby a substitute for the undesirable high carbohydrate-containing candy, chocolate, and the like is provided while retaining all of the benefits of a high protein diet.

It will thus be seen that the objects set forth above, among those made apparent from the preceding description, are efficiently attained and, since certain changes may be made in carrying out the above method and in the compounds set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A method for making a foamed meat flake of relatively long shelf life without refrigeration comprising comminuting meat selected from the group consisting of fresh meat containing 10 to 25% protein, 5 to 50% fat and 30 to 80% water, and dried meat containing 50 to 80% protein, 10 to 60% fat and 1.0 to 12% water, emulsifying the comminuted meat with additional water up to 20% by weight of the comminuted meat and salt and flavoring to form an emulsion, processing the emulsion to an internal temperature of 145° F.–147° F., cooling the emulsion, slicing the cooled emulsion into thin slices and drying said slices with microwave energy to a dryness of from 2 to 6% to form a foamed meat flake.

References Cited

UNITED STATES PATENTS

| | | | |
|---|---|---|---|
| 2,346,232 | 4/1944 | Piret et al. | 99—208 |
| 2,457,063 | 12/1948 | Morgan et al. | 99—208 |
| 2,820,709 | 1/1958 | Schack et al. | 99—108 |
| 2,899,311 | 8/1959 | Zick | 99—108 |
| 3,063,848 | 11/1962 | Van Gelder. | |
| 3,235,971 | 2/1966 | Tooby. | |
| 3,329,510 | 7/1967 | Paynter et al. | 99—208 X |

FOREIGN PATENTS 940,003    10/1963    Great Britain.

HYMAN LORD, Primary Examiner

UNITED STATES PATENT OFFICE
CERTIFICATE OF CORRECTION

Patent No. 3,520,701                                         July 14, 1970

Robert B. Rendek et al.

It is certified that error appears in the above identified patent and that said Letters Patent are hereby corrected as shown below:

In the heading to the printed specification, lines 3 to 6, "Robert B. Rendek, 411 Clayton Road, Hillside, Ill. 60162; Joseph C. Wilcox, 3 West Rocket Circle, Park Forest, Ill. 60460; and Everett W. Stone, Jr., 9424 Jackson Ave., Brookfield, Ill. 60513" should read -- Robert B. Rendek, Hillside, Joseph C. Wilcox, Park Forest, and Everett W. Stone, Jr., Brookfield, Ill., assignors to Armour and Company, Chicago, Ill., a corporation of Delaware --.

Signed and sealed this 16th day of March 1971.

(SEAL)
Attest:

Edward M. Fletcher, Jr.
Attesting Officer

WILLIAM E. SCHUYLER, JR.
Commissioner of Patents